United States Patent
Khan et al.

(10) Patent No.: US 8,780,812 B2
(45) Date of Patent: Jul. 15, 2014

(54) APPARATUS AND METHOD FOR ASYNCHRONOUS AND ADAPTIVE HYBRID ARQ SCHEME IN A WIRELESS NETWORK

(75) Inventors: Farooq Khan, Allen, TX (US); Juho Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 350 days.

(21) Appl. No.: 11/687,473

(22) Filed: Mar. 16, 2007

(65) Prior Publication Data

US 2007/0223404 A1    Sep. 27, 2007

Related U.S. Application Data

(60) Provisional application No. 60/785,643, filed on Mar. 24, 2006.

(51) Int. Cl.
*H04L 1/18* (2006.01)

(52) U.S. Cl.
CPC ................................... *H04L 1/1819* (2013.01)
USPC ...................................... 370/329; 455/452.1

(58) Field of Classification Search
CPC ... H04L 1/1893; H04L 1/1812; H04L 1/1819; H04L 1/1822; H04L 1/1825; H04W 72/04; H04W 72/042; H04W 72/0406; H04W 72/0413; H04W 72/0446
USPC ................................ 370/236, 329; 455/452.1
See application file for complete search history.

(56) References Cited

U.S. PATENT DOCUMENTS

| | | | | |
|---|---|---|---|---|
| 6,320,879 | B1 * | 11/2001 | Bremer | 370/493 |
| 7,152,196 | B2 * | 12/2006 | Wu et al. | 714/748 |
| 7,979,768 | B2 * | 7/2011 | Sammour et al. | 714/748 |
| 2002/0159410 | A1 * | 10/2002 | Odenwalder et al. | 370/329 |
| 2003/0012174 | A1 * | 1/2003 | Bender et al. | 370/347 |
| 2006/0209783 | A1 * | 9/2006 | Jain et al. | 370/349 |
| 2007/0168827 | A1 * | 7/2007 | Lohr et al. | 714/749 |
| 2007/0177569 | A1 * | 8/2007 | Lundby | 370/349 |
| 2007/0211660 | A1 * | 9/2007 | Teague | 370/329 |

FOREIGN PATENT DOCUMENTS

| | | |
|---|---|---|
| EP | 1 389 848 A1 | 2/2004 |
| EP | 1 545 040 A1 | 6/2005 |
| EP | 1 557 968 A1 | 7/2005 |

OTHER PUBLICATIONS

Samsung, Low Overhead Asynchronous Adaptive Hybrid ARQ, R1-061338, 3GPP TSG RAN WG1 Meeting #45, Shanghai, China, May 8-12, 2006, pp. 1-4.*
A. Das, F. Khan, and A. Nanda, "A2 IR: an asynchronous and adaptive hybrid ARQ scheme for 3G evolution," in Proceedings of Vehicular Technology Conference (VTC), Rhodes, Greece, vol. 1, pp. 628-632. May 6-9, 2001.*

(Continued)

*Primary Examiner* — Kibrom T Hailu
*Assistant Examiner* — Benjamin Lamont

(57) ABSTRACT

A low overhead asynchronous and adaptive Hybrid Acknowledgment Request (HARQ) technique for use in wireless networks. First control information is transmitted with the first subpacket and subsequent control information is transmitted with transmissions of subsequent subpackets only if the retransmission is done asynchronously or if the duration of the retransmission is changed.

21 Claims, 15 Drawing Sheets

(56) References Cited

OTHER PUBLICATIONS

Das, A.; Khan, F.; Sampath, Ashwin; Su, H.-J. "Adaptive, asynchronous incremental redundancy (A2IR) with fixed transmission time intervals (TT1) for HSDPA", Personal, Indoor and Mobile Radio Communications, 2002. The 13th IEEE International Symposium on, On pp. 1083-1087 vol. 3 vol. 3, Sep. 15-18, 2002.*

3GPP TSG RAN WG1 Meeting #48; "Downlink Hybrid ARQ Signaling" St. Louis, Missouri, Samsung, Feb. 12-16, 2007; 4 pages.

European Search Report dated Jan. 3, 2013 in connection with European Patent Application No. 07006081.9.

\* cited by examiner

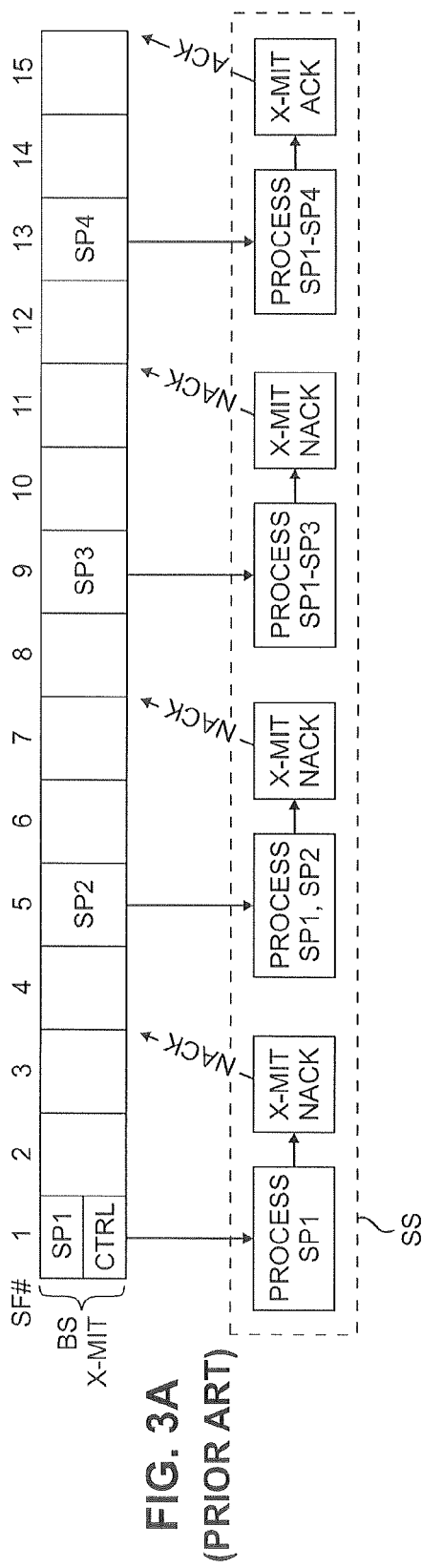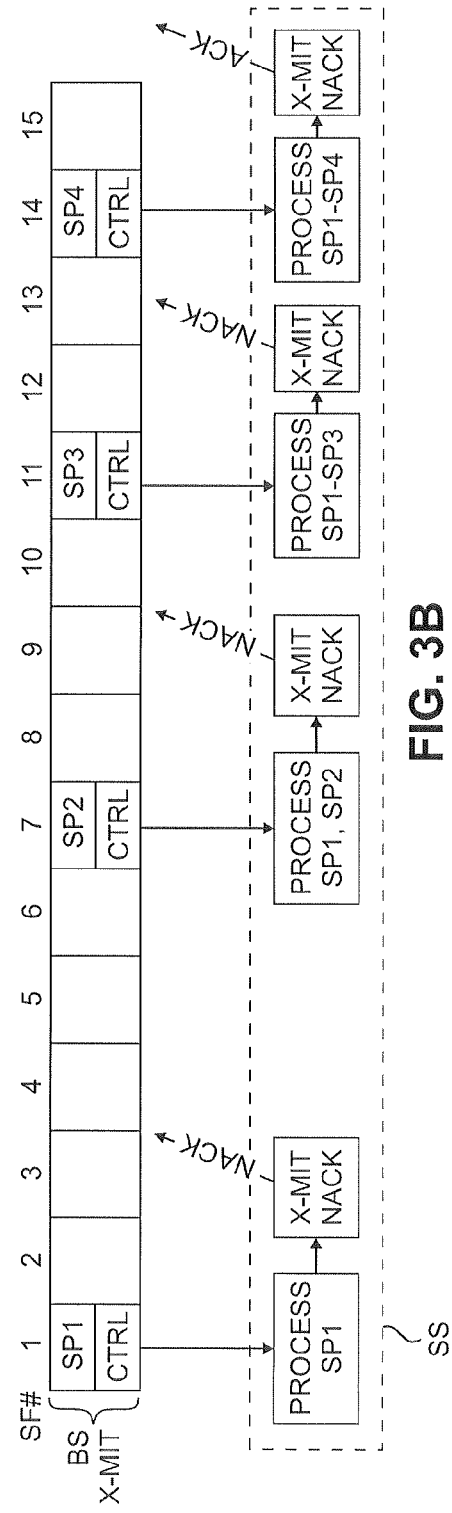
FIG. 3A (PRIOR ART)
FIG. 3B (PRIOR ART)

| FIELD | SIZE (BITS) | COMMENT |
| --- | --- | --- |
| ID (SS OR GROUP SPECIFIC) | 8 | INDICATES SS OR SS GROUP TO WHICH DATA IS SENT |
| RESOURCE ASSIGNMENT | 5 | INDICATES WHICH RESOURCE UNITS THE SS(s) SHOULD DEMODULATE |
| TRANSMISSION DURATION | 2 | INDICATES TRANSMISSION DURATION |
| MODULATION SCHEME | 2 | QPSK, 16QAM, 64QAM |
| MULTI-ANTENNA RELATED INFORMATION | 5 | CONTENT DEPENDS ON THE MIMO/ BEAMFORMING SCHEME(S) SELECTED |
| PAYLOAD SIZE | 6 | THE INFORMATION BLOCK SIZE |
| HARQ PROCESS NUMBER | 3 | INDICATES THE HARQ PROCESS THE CURRENT TRANSMISSION IS ADDRESSING |
| HARQ REDUNDANCY VERSION | 2 | TO SUPPORT INCREMENTAL REDUNDANCY HARQ |
| NEW DATA INDICATOR | 1 | TO HANDLE HARQ SOFT BUFFER CLEARING |

APPARATUS AND METHOD FOR ASYNCHRONOUS AND ADAPTIVE HYBRID ARQ SCHEME IN A WIRELESS NETWORK

CROSS-REFERNCE TO RELATED APPLICATION(S) AND CLAIM OF PRIORITY

The present application is related to U.S. Provisional Patent No. 60/785,643, filed Mar. 24, 2006, entitled "Low Overhead Asynchronous And Adaptive Hybrid ARQ Scheme". Provisional Patent No. 60/785,643 is assigned to the assignee of the present Application hereby claims priority under 35 U.S.C. §119(e) to U.S. Provisional Patent No. 60/785,643.

TECHNICAL FIELD OF THE INVENTION

The present application relates generally to wireless communications and, more specifically, to a hybrid Acknowledgment Request (ARQ) retransmission scheme having low overhead.

BACKGROUND OF THE INVENTION

Hybrid Acknowledgment Request (HARQ) is a retransmission technique whereby a transmitting device, such as a base station (BS) in a wireless network, transmits redundant coded information in small increments to a receiving device, such as a mobile station (MS), subscriber station (SS), or other wireless terminal that is accessing the wireless network. In the transmitting device, a channel coder processing block encodes a data packet (P) according to a conventional algorithm, such as Viterbi encoding or turbo encoding. The output of the channel coder is the original data packet (P), plus some redundant coding data.

Next, a subpacket generator processing block generates a plurality of subpackets (SP1, SP2, SP3 . . . ) from the data packet (P) and the redundant coding data at the output of the channel coder. The transmitting device then transmits the subpackets individually and waits after each subpacket transmission for either an acknowledgment (ACK) message or a negative acknowledgment (NACK) message from the receiving device. Once the transmitting device receives from the receiving device an ACK message indicating that the original data packet (P) has been correctly received, the transmitting device stops transmitting subpackets, even if less than all of the subpackets have been sent.

By way of example, a base station that implements turbo coding generates a first set of parity bits (P1) from an original data packet (P) and generates a second set of parity bits (P2) from an interleaved version (P') of the data packet (P). The base station then assembles the data packet (P), the first parity bits (P1), and the second parity bits (P2) into a frame of outgoing data. The outgoing frame is divided into M subpackets (SP1, SP1, SP3 . . . SPm) prior to transmission.

The subscriber station (SS) or other receiving device only needs to collect enough subpackets to correctly reassemble the original data packet (P), as indicated by a successful CRC (cyclic redundancy check). Therefore, the subscriber station transmits an ACK message only after enough subpackets have been received to correctly reassemble the original data packet (P). Prior to that, the subscriber station transmits a NACK message after each subpacket is received. By way of example, if four subpackets (SP1, SP2, SP3, SP4) are required to correctly reassemble the original data packet (P), the subscriber station transmits a NACK message after the fist three subpackets (SP1, SP2, SP3) and transmits an ACK message only after the fourth subpacket (SP4) is received.

In a multi-user environment in which a base station communicates with N subscriber stations, the base station transmits subpackets to a particular subscriber station only in selected subframes determined by a control message transmitted by the base station. The base station may transmit subpackets synchronously (e.g., every Nth subframe) or asynchronously (e.g., when ready).

In an N-channel stop-and-wait (SAW) synchronous hybrid ARQ system, N is assumed equal to 4. For synchronous HARQ, the retransmissions happen at fixed time intervals (in this example, every fourth subframe). With N=4, if the first subpacket is transmitted in subframe 1, the retransmissions can only happen in subframes 5, 9 and 13. In case of N-channel stop-and-wait (SAW), N parallel information packets can be transmitted on each of the N SAW channels.

Advantageously, in a synchronous HARQ system, the control information for the HARQ operation only needs to be transmitted along with the first subpacket transmission because the timing of the retransmissions thereafter is predetermined. However, the drawback of synchronous HARQ is that the retransmission subpackets cannot be scheduled during preferable channel conditions, because the timing of the retransmission is predetermined. Also, the modulation, coding and resource format cannot be adapted at the time of retransmission according to the prevailing channel conditions at the time of retransmission.

In an N-channel stop-and-wait (SAW) asynchronous Hybrid ARQ system, the retransmission timing, modulation, coding and resource format may be adapted according to the prevailing channel and resource conditions at the time of retransmission. One major drawback of this type of asynchronous and adaptive HARQ is that the control information needs to be sent along with all the subpackets every time. The control information transmission along with each subpacket allows adjusting the transmission timing and adjusting the new modulation, coding and resource format information. However, the transmission of control information along with each subpacket leads to excessive overhead. Also, the control information in asynchronous HARQ must be transmitted even if the transmission timing, modulation, coding and resource information are unchanged since the last subpacket transmission. This introduces redundancy in the transmission of the control information without any significant benefit.

Therefore, there is a need in the art for an improved hybrid Acknowledgment Request (HARQ) technique for use in wireless networks. In particular, there is a need for an improved HARQ technique that has the low overhead of a synchronous HARQ system and the adaptability of an asynchronous HARQ system.

SUMMARY OF THE INVENTION

A low overhead asynchronous and adaptive Hybrid Acknowledgment Request (HARQ) technique is provided in which first control information is transmitted with the first subpacket and subsequent control information is transmitted with transmissions of subsequent subpackets only if the retransmission timing or duration is changed.

In one embodiment of the present disclosure, a base station is provided for use in a wireless network that communicates with a plurality of subscriber stations. The base station communicates with a first subscriber station using an adaptable asynchronous hybrid acknowledge request (HARQ) technique in which the base station transmits an original data packet to the first subscriber station as a plurality of subpackets distributed in subframes of a downlink channel and the first subscriber station transmits one of an ACK message and a NACK message in an uplink channel in response to each of the plurality of subpackets. The base station transmits to the first subscriber station a first subpacket and first control information in a first subframe and transmits a subsequent second subpacket to the first subscriber station in one of synchronous mode and asynchronous mode. The base station transmits in synchronous mode by transmitting subsequent subpackets in synchronous subframes after the first subframe and transmits the subsequent second subpacket without additional control information in a synchronous second subframe occurring N subframes after the first subframe. The base station transmits in asynchronous mode by transmitting the subsequent second subpacket and second control information in an asynchronous second subframe occurring after the first subframe.

The first control information is usable by the first subscriber station to process the first subpacket and to process subsequent subpackets that are received from the base station in synchronous mode. The second control information is usable by the first subscriber station to process the subsequent second subpacket.

In another embodiment of the present disclosure, a method is provided for use in a base station that communicates with a plurality of subscriber stations. The method communicates with a first subscriber station using an adaptable asynchronous hybrid acknowledge request (HARQ) technique in which the base station transmits an original data packet to the first subscriber station as a plurality of subpackets distributed in subframes of a downlink channel. The method comprises the steps of transmitting to the first subscriber station a first subpacket and first control information in a first subframe; and one of: i) transmitting a subsequent second subpacket to the first subscriber station in synchronous mode, and ii) transmitting a subsequent second subpacket to the first subscriber station in asynchronous mode.

The step of transmitting in synchronous mode transmits subsequent subpackets in synchronous subframes after the first subframe, wherein the subsequent second subpacket is transmitted without additional control information in a synchronous second subframe occurring N subframes after the first subframe. The step of transmitting in asynchronous mode transmits the subsequent second subpacket and second control information in an asynchronous second subframe occurring after the first subframe.

In still another embodiment of the present disclosure, a subscriber station is provided that communicates with a base station of a wireless network using an adaptable asynchronous hybrid acknowledge request (HARQ) technique in which the base station transmits an original data packet to the subscriber station as a plurality of subpackets distributed in subframes of a downlink channel and the subscriber station transmits one of an ACK message and a NACK message in an uplink channel in response to each of the received subpackets. The subscriber station receives from the base station a first subpacket and first control information in a first subframe and receives a subsequent second subpacket from the base station in one of synchronous mode and asynchronous mode. The subscriber station receives in synchronous mode by receiving subsequent subpackets in synchronous subframes after the first subframe and receives the subsequent second subpacket without additional control information in a synchronous second subframe occurring N subframes after the first subframe. The subscriber station receives in asynchronous mode by receiving the subsequent second subpacket and second control information in an asynchronous second subframe occurring after the first subframe.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 3A illustrates N-channel stop-and-wait (SAW) synchronous hybrid ARQ according to a conventional embodiment;

FIG. 3B illustrates N-channel stop-and-wait (SAW) asynchronous hybrid ARQ according to a conventional embodiment;

FIG. 4 illustrates Table 400, which is an example of a control signaling message for a HARQ system;

DETAILED DESCRIPTION OF THE INVENTION

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless network.

The transmission technique disclosed herein may advantageously be embodied in a wireless network that dynamically allocates resources to hybrid Acknowledgement Request (ARQ) messages according to the disclosure in U.S. patent application Ser. No. 11/390,056, which is hereby incorporated by reference as if fully set forth herein. Thus, a resource (e.g., communication channel) allocated to an ACK/NACK message may be dynamically identified in a control channel message accompanying the data packet or data subpacket transmission from the transmitting device (e.g., a base station). The receiving device (e.g., a subscriber station) then sends an ACK or NACK message informing the transmitting device about the successful or unsuccessful transmission of the packet. The ACK/NACK is sent using the resource identified in the control channel message sent by the transmitting device.

Hybrid Acknowledgement Request (HARQ) techniques are used in a wide variety of wireless network protocols. In the exemplary descriptions that follow, it shall be assumed generally that transmitters and receivers are operating in OFDMA mode solely for the purposes of clarity and conciseness in illustrating the principles of the present disclosure. However, the OFDMA embodiment described herein should not be construed to limit the scope of the disclosure. In alternate embodiments, the transmitters and receivers may operate in OFDM mode or another multi-carrier mode, in CDMA mode, in GSM mode, or in another wireless protocol mode without departing from the principles of the disclosure.

Figure 1:
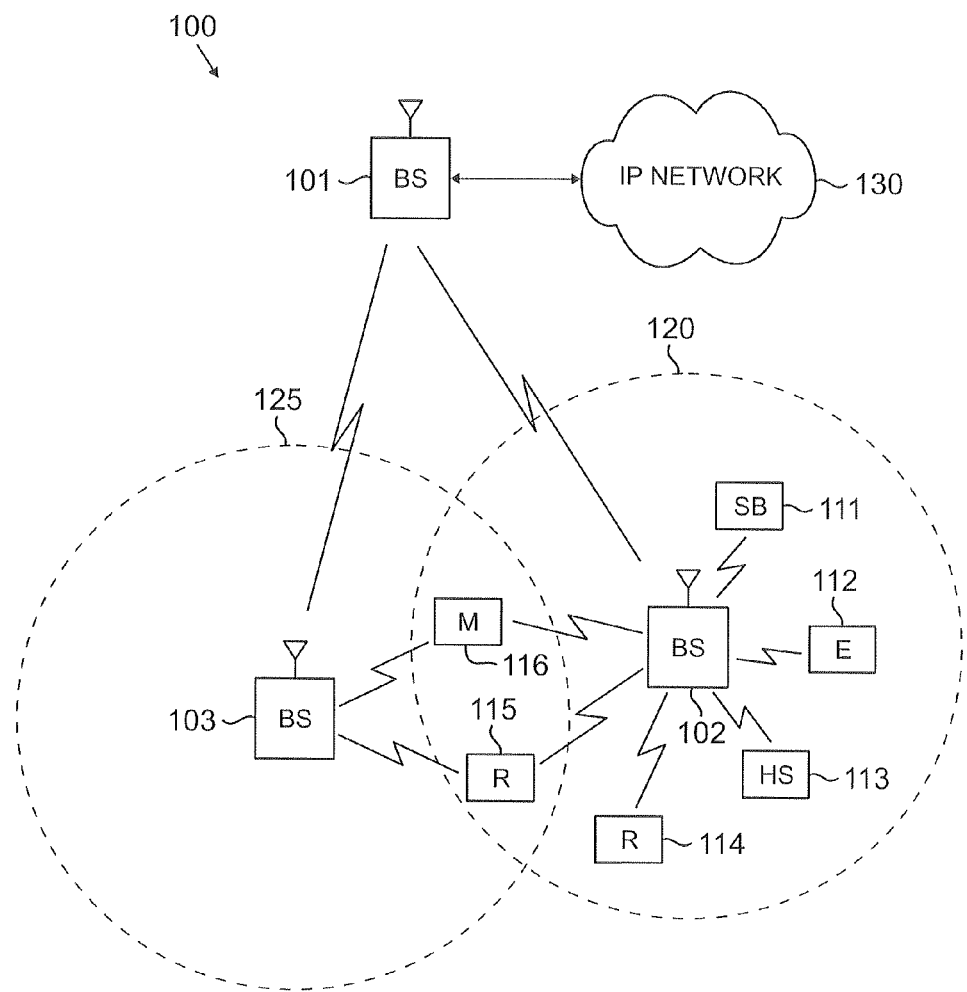
FIG. 1 illustrates an exemplary wireless network that implements a low-overhead, asynchronous and adaptive hybrid ARQ scheme according to an exemplary embodiment of the disclosure.

FIG. 1 illustrates exemplary wireless network 100, which implements a low-overhead, asynchronous and adaptive hybrid Acknowledgement Request (HARQ) scheme according to the principles of the present disclosure. In the illustrated embodiment, wireless network 100 includes base station (BS) 101, base station (BS) 102, base station (BS) 103, and other similar base stations (not shown). Base station 101 is in communication with base station 102 and base station 103. Base station 101 is also in communication with Internet 130 or a similar IP-based network (not shown).

Base station 102 provides wireless broadband access (via base station 101) to Internet 130 to a first plurality of subscriber stations within coverage area 120 of base station 102. The first plurality of subscriber stations includes subscriber station 111, which may be located in a small business (SB), subscriber station 112, which may be located in an enterprise (E), subscriber station 113, which may be located in a WiFi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access (via base station 101) to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM or OFDMA techniques.

Base station 101 may be in communication with either a greater number or a lesser number of base stations. Furthermore, while only six subscriber stations are depicted in FIG. 1, it is understood that wireless network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

Figure 2A:
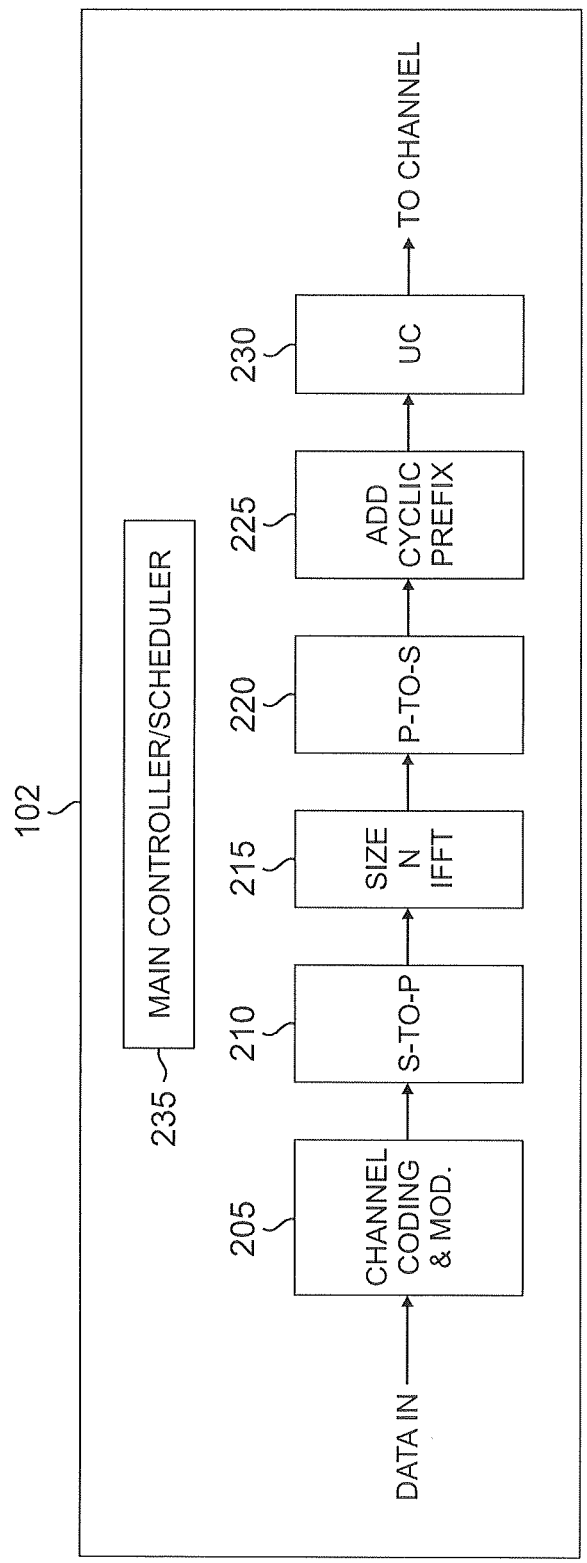
FIG. 2A is a high-level diagram of an orthogonal frequency division multiple access (OFDMA) transmit path.
Figure 2B:
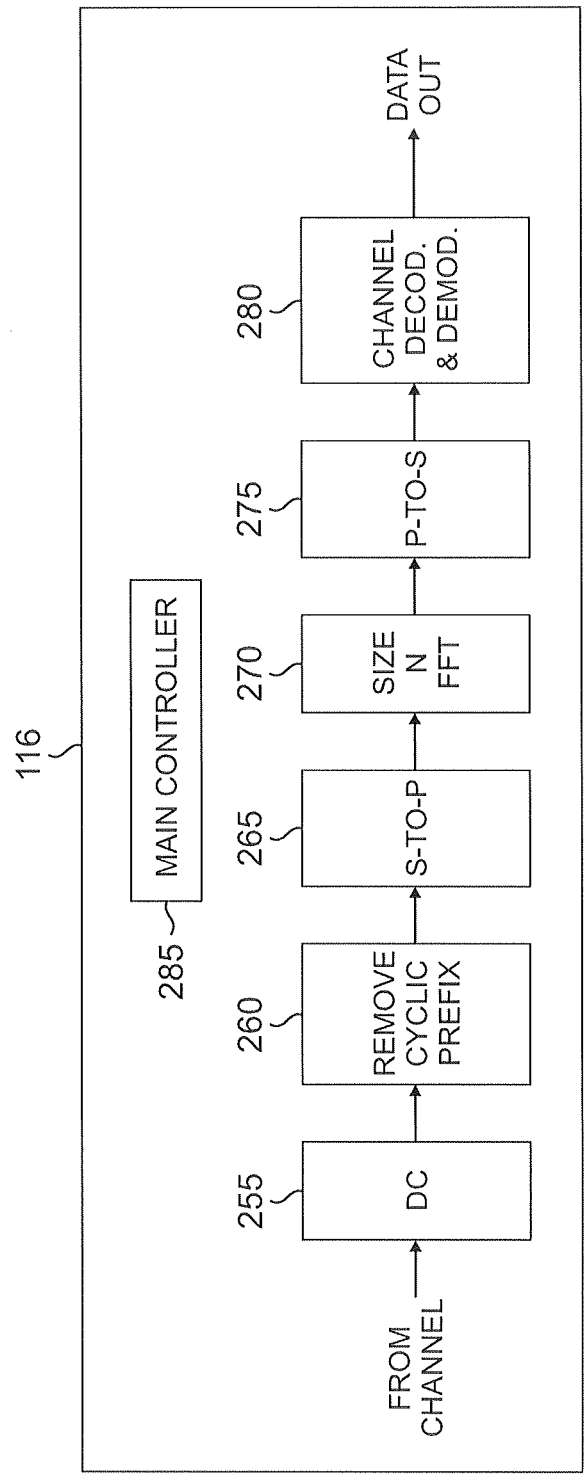
FIG. 2B is a high-level diagram of an orthogonal frequency division multiple access (OFDMA) receive path.

FIG. 2A is a high-level diagram of an orthogonal frequency division multiple access (OFDMA) transmit path. FIG. 2B is a high-level diagram of an orthogonal frequency division multiple access (OFDMA) receive path. In FIGS. 2A and 2B, the OFDMA transmit path is implemented in base station (BS) 102 and the OFDMA receive path is implemented in subscriber station (SS) 116 for the purposes of illustration and explanation only. However, it will be understood by those skilled in the art that a similar (though not identical) OFDMA receive path may also be implemented in BS 102 and a similar (though not identical) OFDMA transmit path may be implemented in SS 116.

The transmit path in BS 102 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, up-converter (UC) 230, and main controller and scheduler 235 (hereafter, simply main controller 235). The receive path in SS 116 comprises down-converter (DC) 255, remove cyclic prefix block 260, serial-to-parallel (S-to-P) block 265, Size N Fast Fourier Transform (FFT) block 270, parallel-to-serial (P-to-S) block 275, channel decoding and demodulation block 280, and main controller 285.

At least some of the components in FIGS. 2A and 2B may be implemented in software while other components may be implemented by configurable hardware or a mixture of software and configurable hardware. In particular, it is noted that the FFT blocks and the IFFT blocks described in this disclosure document may be implemented as configurable software algorithms executed by a processor, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N parameter may be any integer number (i.e., 1, 2, 3, 4, etc.), while for FFT and IFFT functions, the value of the N parameter may be any integer number that is a power of two (i.e., 1, 2, 4, 8, 16, etc.).

In BS 102, channel coding and modulation block 205 receives a set of information bits, applies coding (e.g., Turbo coding) and modulates (e.g., QPSK, QAM) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and SS 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at SS 116 after passing through the wireless channel and reverse operations to those at BS 102 are performed. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

The transmit path and receive path components described herein and illustrated in FIGS. 2A and 2B are configurable devices that may be re-programmed and controlled by main controller 235 in BS 102 or main controller 285 in SS 116. Thus, for example, main controller 235 is operable to configure modulation block 205 to adapt to different modulation techniques (e.g., BPSK, QPSK, QAM, etc.). Similarly, main controller 285 is operable to similarly configure demodulation block 280. Main controllers 235 and 285 are also operable to modify the value of Size N.

Each of base stations 101-103 may implement a transmit path that is analogous to transmitter 200 for transmitting in the downlink to subscriber stations 111-116 and may implement a receive path that is analogous to receiver 250 for receiving in the uplink from subscriber stations 111-116. Similarly, each one of subscriber stations 111-116 may implement a transmit path corresponding to the architecture of transmitter 200 for transmitting in the uplink to base stations 101-103 and may implement a receive path corresponding to the architecture of receiver 250 for receiving in the downlink from base stations 101-103.

There may be a large number of subscriber stations present in wireless network 100. Due to the bursty nature of data traffic, typically only a few subscriber stations are scheduled to receive a transmission at a given time. A mechanism for dynamic allocation of ACK/NACK channels was disclosed in U.S. patent application Ser. No. 11/390,056, which was incorporated by reference above. Main controllers 235 and 285 are operable to allocate uplink channel resources to subscriber stations 111-116 as described in U.S. patent application Ser. No. 11/390,056. In one embodiment of the present disclosure, each one of base stations 101-103 is capable of dynamically allocating uplink channel resources to subscriber stations 111-116 according to the number of subscriber stations that will be receiving downlink data transmissions and will be required therefore to send ACK or NACK messages (and associated pilot signals) back to a transmitting base station. The uplink channel resources may be independently and selectively allocated for each transmission, rather than being permanently dedicated to particular subscriber stations.

FIG. 3A illustrates N-channel stop-and-wait (SAW) synchronous hybrid acknowledgment request (HARQ) technique according to a conventional embodiment. In FIG. 3A, an exemplary portion of the downlink frame transmitted by a base station (BS X-mit) is shown at the top. The downlink frame portion comprises fifteen (15) subframes (SFs) consecutively numbered SF1 through SF15. In an OFDMA network, each subframe may comprise a plurality of time slots in which OFDMA symbols are transmitted. By way of example, each one of subframes SF1 through SF15 may comprise eight (8) time slots, where each time slot contains a single OFDMA symbol comprising 512 subcarriers (or tones). In an alternate code division multiple access (CDMA) embodiment, each subframe may comprise a plurality of CDMA codes.

In FIG. 3A, the base station (BS) transmits a data packet P and redundant coding data to a subscriber station (SS) in a synchronous (or periodic) manner. The data packet and redundant coding data are divided into M subpackets, including exemplary subpackets SP1, SP2, SP3, SP4, and so forth. The base station (BS) transmits in subframe SF1 both control (CTRL) information and subpacket SP1.

In the case of a synchronous HARQ protocol, the retransmissions happen at fixed time intervals. The retransmission rate, N, is assumed equal to 4. With N=4, if the first subpacket is transmitted in subframe 1, the retransmissions can only happen in every $4^{th}$ subframe thereafter (i.e., subframes SF5, SF9, SF13). In case of N-channel stop-and-wait (SAW), N parallel information packets can be transmitted on each of the N SAW channels.

The subscriber station (SS) receives the control (CTRL) information and subpacket SP1 in subframe SF1 and uses the control information to process SP1 in order to recover the original data packet P. It is assumed that the subscriber station (SS) is unable to recover data packet P, so the subscriber station (SS) transmits a negative acknowledgment (NACK) message back to the base station (BS). The subpacket SP1 is not thrown away, but is stored.

When the base station (BS) transmits subpacket SP2 during subframe SF5, the subscriber station (SS) processes subpackets SP1 and SP2 together in order to recover the original data packet P. It is assumed that the subscriber station (SS) is again unable to recover data packet P, so the subscriber station (SS) transmits a negative acknowledgment (NACK) message back to the base station (BS). The subpackets SP1 and SP2 are both stored.

Next, the base station (BS) transmits subpacket SP3 during subframe SF9. The subscriber station (SS) processes subpackets SP1, SP2 and SP3 together in order to recover the original data packet P. It is assumed that the subscriber station (SS) is again unable to recover data packet P, so the subscriber station (SS) transmits a negative acknowledgment (NACK) message back to the base station (BS). The subpackets SP1-SP3 are now stored in the subscriber station.

Finally, the base station (BS) transmits subpacket SP4 during subframe SF13. The subscriber station (SS) processes subpackets SP1-SP4 together in order to recover the original data packet P. This time, the subscriber station (SS) successfully recovers data packet P, so the subscriber station (SS) transmits an acknowledgment (ACK) message back to the base station (BS).

One of the benefits of the synchronous HARQ technique depicted in FIG. 3A is that the control information in subframe SF1 only needs to be transmitted along with the first subpacket SP1, because the timing of the remaining subpacket transmissions (or retransmissions) is predetermined. However, the drawback of the synchronous HARQ technique is that the individual subpacket transmissions (or retransmissions) cannot be scheduled at preferable channel conditions because the timing of the retransmissions is predetermined. Also, the modulation, coding and resource format (i.e., subcarrier time-frequency slots) cannot be adapted at the time of the individual subpacket retransmissions according to the prevailing channel conditions at the time of retransmissions.

FIG. 3B illustrates N-channel stop-and-wait (SAW) asynchronous hybrid ARQ according to a conventional embodiment. In FIG. 3B, an exemplary portion of the downlink frame transmitted by a base station (BS X-mit) is shown at the top. FIG. 3A is similar to FIG. 3B in many ways, except that the transmissions (or retransmissions) of subpackets SP2-SP4 occur in an asynchronous or aperiodic manner.

In case of asynchronous HARQ the retransmission timing, control (CTRL) information must be transmitted with each one of subpackets SP1-SP4. Thus, first control information is transmitted with subpacket SP1 in subframe SF1, second control information is transmitted with subpacket SP2 in subframe SF7, third control information is transmitted with subpacket SP3 in subframe SF11, and fourth control information is transmitted with subpacket SP4 in subframe SF14. It is noted that in subframes SF1, SF7, SF11 and SF14 are asynchronous or aperiodic.

Advantageously, the individually modifiable control information transmitted in subframes SF1, SF7, SF11 and SF14 may be used to adapt one or more of the modulation, coding and resource format (i.e., subcarrier time-frequency slots) in each subframe according to the prevailing channel and resource conditions at the time of transmission of each one of subpackets SP1, SP2, SP3 and SP4. However, a major drawback of this type of asynchronous and adaptive HARQ is that the control information is sent along with all subpackets, which greatly increases the control messaging overhead. It is noted that control information in conventional asynchronous HARQ systems must be transmitted even if the transmission timing, modulation, coding and resource information of the retransmission are unchanged from the previous subframe. This introduces redundancy in the transmission of the control information without any significant benefit.

FIG. 4 illustrates Table 400, which is an example of a control signaling message for a HARQ system. The control information message can either be targeted to a single subscriber station (SS) (or mobile station (MS), mobile terminal (MT), user equipment (UE), etc.) or to multiple subscriber stations. In case of control signaling message for multiple subscriber stations, separate control fields are needed for each of the subscriber stations targeted by the control message.

The hybrid ARQ related information consists of Hybrid ARQ process number, which is the ID of the SAW channel. Assuming a 3-bit Hybrid ARQ Process Number, a maximum of eight (8) SAW channels may be supported. The Hybrid ARQ Redundancy Version indicates the subpacket ID. Assuming a 2-bit Hybrid ARQ Redundancy Version, a maximum of four (4) subpacket IDs may be supported. The 1-bit New Data indicator is used to indicate if the subpacket is from the current information packet or a new information packet. When the New Data indicator bit is set to Logic 1, it indicates the start of a new information packet and therefore, the subscriber station receiver may discard any stored subpackets on the corresponding SAW channel.

The present disclosure introduces a new asynchronous and adaptive HARQ technique in which the control (CTRL) information is only transmitted if at least one of the subpacket timing, modulation, coding, transmission duration or resource parameters is to be changed. Advantageously, this avoids the transmission of redundant and unneeded control information when the retransmitted subpackets are sent in a synchronous manner and without modification from a previous subpacket transmission. However, when retransmitted subpackets must be sent in an asynchronous or with modification from a previous subpacket transmission, the control (CTRL) information does accompany the retransmitted subpackets. In this way the control information is only transmitted when necessary. This avoids unnecessary control channel overhead and improves system throughput and performance.

Figure 5:
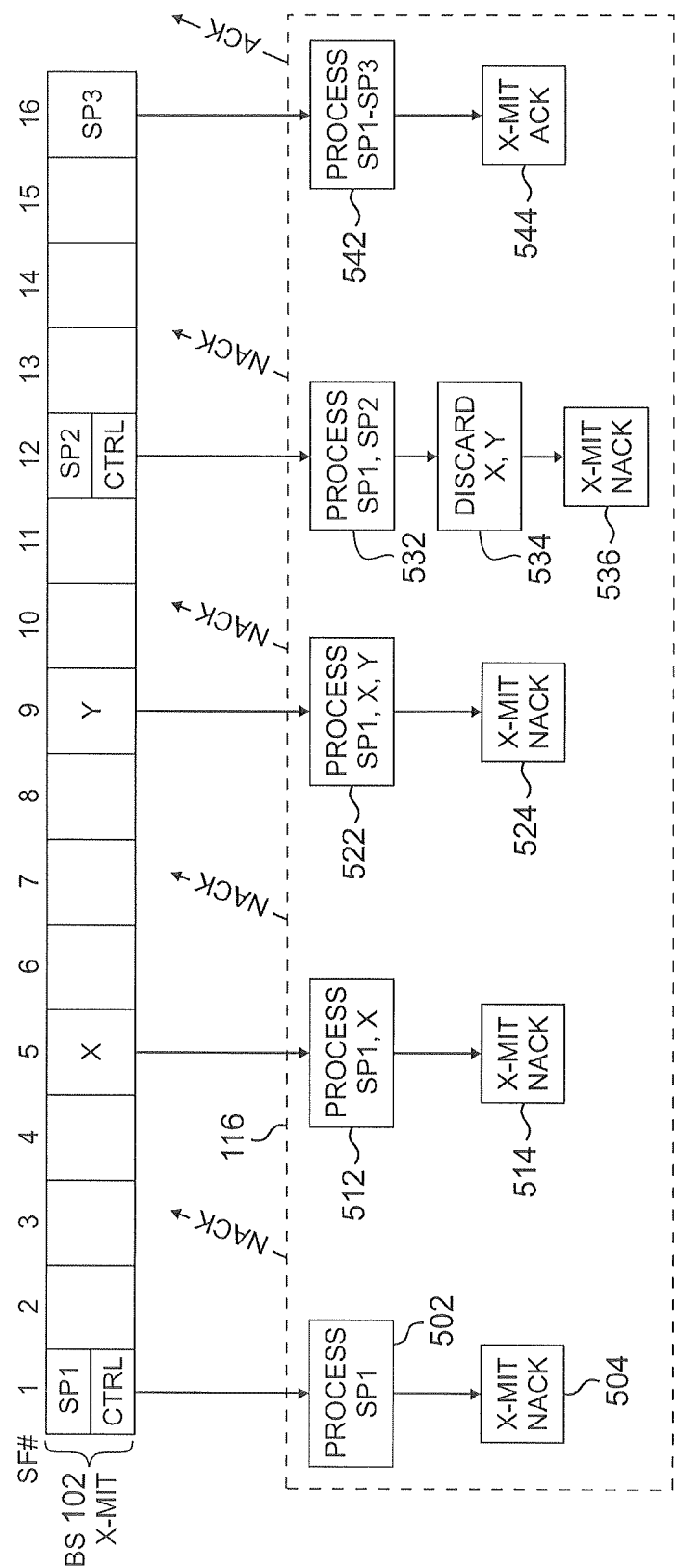
FIG. 5 illustrates a low overhead asynchronous hybrid acknowledgment request (HARQ) technique according to the principles of the present disclosure.

FIG. 5 illustrates a low overhead asynchronous hybrid acknowledgment request (HARQ) technique according to the principles of the present disclosure. In FIG. 5, base station (BS) 102 transmits a first subpacket and first control information in subframe SF1. Subscriber station (SS) 116 receives the first control information and subpacket SP1 and uses the first control information to process subpacket SP1 (process step 502). Assuming SS 116 is unable to recover the original data packet P, SS 116 transmits a NACK message to BS 102 (process step 504).

However, the retransmission (or transmission) of the second subpacket SP2 is delayed until subframe SF12 (i.e., asynchronous. Nonetheless, SS 116 always tries to receive the retransmitted subpackets under the assumption of synchronous retransmissions. In this example, it is assumed that N=4, so that SS 116 expects a retransmission of subpacket SP2 in subframe SF5 (i.e., every 4$^{th}$ subframe). Since BS 102 has preempted the transmission of subpacket SP2 with transmission of data X to another subscriber station, SS 116 erroneously processes SP1 and X (process step 512). Since SS 116 is still unable to recover the original data packet P, SS 116 transmits a second NACK message to BS 102 (process step 514). Both subpacket SP1 and Data X remain stored in SS 116.

Similarly, in subframe SF9, SS 116 expects transmission of subpacket SP3, but BS 102 transmits data Y to another subscriber station. SS 116 erroneously processes SP1, X and Y (process step 522). Since SS 116 is still unable to recover the original data packet P, SS 116 transmits a third NACK message to BS 102 (process step 524). Subpacket SP1, Data X, and Data Y are all stored in SS 116.

After three unsuccessful decoding attempts in subframes SF1, SF5 and SF9, subscriber station (SS) 116 expects the next synchronous retransmission to occur in subframe SF13. However, in subframe SF12, SS 116 decodes a second control (CRTL) information signal indicating transmission of subpacket SP2. Upon receiving this second control information, SS 116 determines that the transmissions of Data X and Data Y in subframes SF5 and SF9 were not directed to SS 116.

Therefore, SS 116 processes subpackets SP1 and SP2 (process step 532) and discards X and Y (process step 534).

Assuming SS 116 is still unable to recover the original data packet P from subpackets SP1 and SP2, SS 116 transmits a NACK message to BS 102 (process step 536). BS 102 then retransmits subpacket SP3 in a synchronous manner in subframe SF16. In this case, however, no control information is transmitted along with subpacket SP3. After subframe SF12, SS 116 now assumes synchronous retransmissions in every 4$^{th}$ subframe beginning at subframe SF12. Thus, in subframe SF16, SS 116 receives and decodes subpacket SP3 using the second control information received in subframe SF12. Next, SS 116 processes subpackets SP1-SP3 together to decode data packet P (process step 542). Assuming SS 116 successfully recovers data packet P, SS 116 transmits and ACK message back to BS 102 (process step 544).

Figure 6:
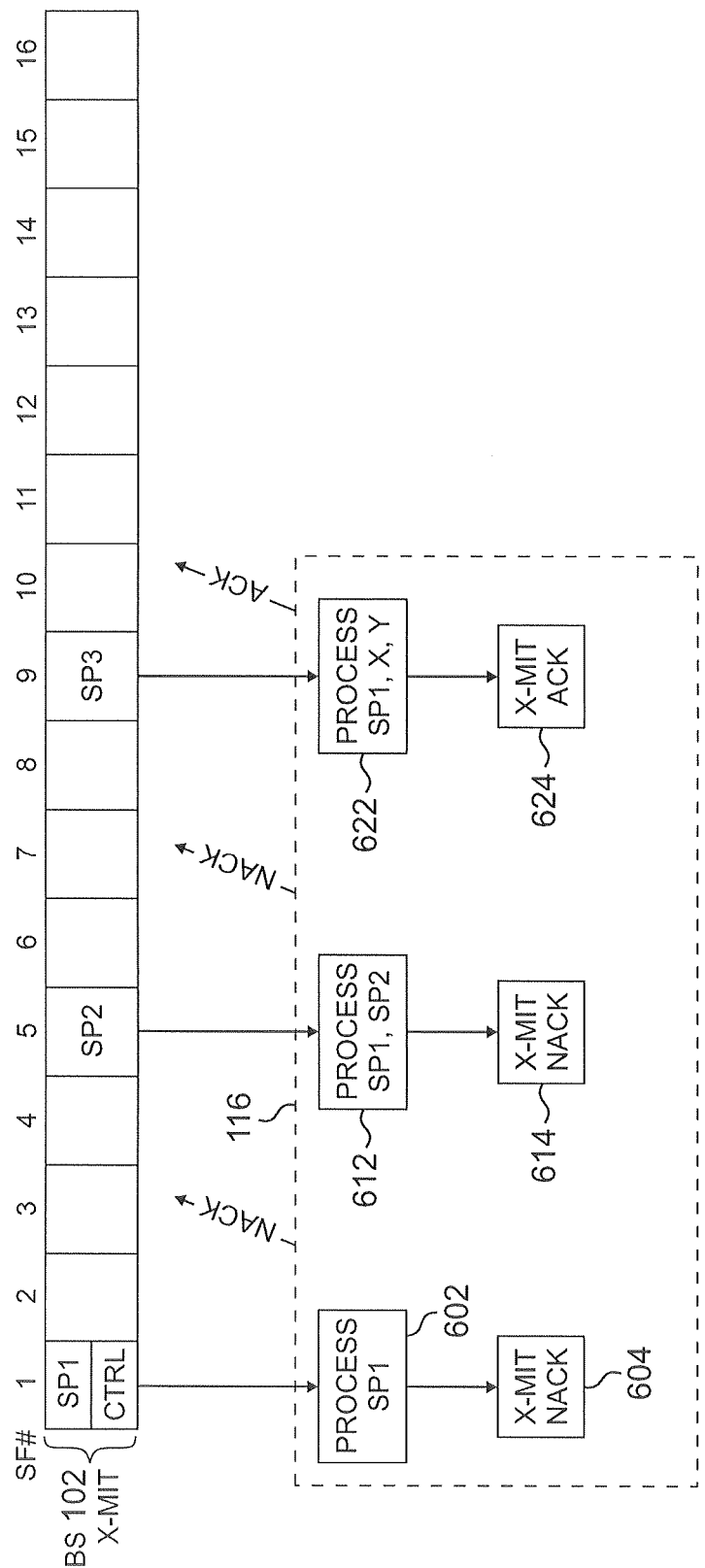
FIG. 6 illustrates a low overhead asynchronous HARQ technique according to one embodiment of the present disclosure.

FIG. 6 illustrates the low overhead asynchronous hybrid acknowledgment request (HARQ) technique according to one embodiment of the disclosure. In FIG. 6, BS 102 transmits first control information along with subpacket SP1 in subframe SF1. Thereafter, retransmissions occur at fixed intervals (N=4) in a synchronous manner. Thus, BS 102 transmits subpacket SP2 in subframe SF5 and transmits subpacket SP3 in subframe SF9.

Subscriber station (SS) 116 receives the first control information and subpacket SP1 in subframe SF1 and uses the first control information to process subpacket SP1 (process step 602). Assuming SS 116 is unable to recover the original data packet P, SS 116 transmits a NACK message to BS 102 (process step 604).

Subscriber station (SS) 116 next receives subpacket SP2 in subframe SF5 and uses the first control information from subframe SF1 to process subpackets SP1 and SP2 together (process step 612). Assuming SS 116 is still unable to recover the original data packet P, SS 116 transmits another NACK message to BS 102 (process step 614).

Finally, subscriber station (SS) 116 receives subpacket SP3 in subframe SF9 and uses the first control information from subframe SF1 to process subpackets SP1-SP3 together (process step 622). Assuming SS 116 successfully recovers the original data packet P, SS 116 transmits an ACK message to BS 102 (process step 624). It should be noted that synchronous HARQ is treated as a special case of the low overhead asynchronous and adaptive HARQ according to the principles of the present disclosure.

Figure 7:
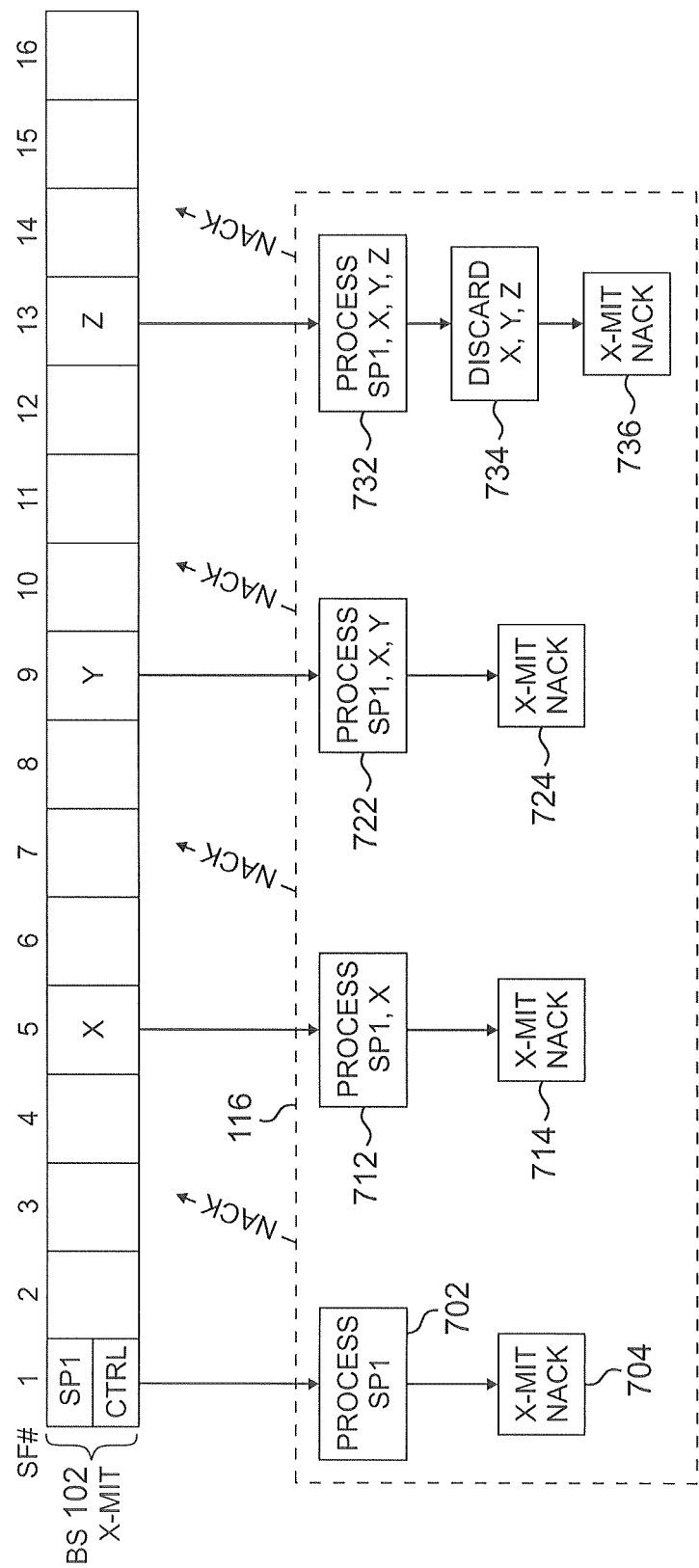
FIG. 7 illustrates a low overhead asynchronous HARQ technique according to another embodiment of the present disclosure.

FIG. 7 illustrates a low overhead asynchronous HARQ technique according to another embodiment of the disclosure. In FIG. 7, BS 102 transmits first control information along with subpacket SP1 in subframe SF1. Thereafter, BS 102 transmits Data X in subframe SF5, Data Y in subframe SF9, and Data Z in subframe SF13. Data X, Data Y and Data Z are directed to subscriber stations other than SS 116. This situation occurs when subpacket retransmissions to SS 116 are preempted by transmissions to other subscriber stations.

In the HARQ technique illustrated in FIG. 7, SS 116 only keeps the transmissions that were received along with control (CTRL) channel information. After the maximum number of transmission attempts is reached and the packet decoding is still unsuccessful, SS 116 assumes that its subpacket retransmissions have been preempted and only keeps the subpacket SP1 received with control information. Thus, SS 116 discards Data X, Data Y and Data Z that did not accompany control channel information.

In FIG. 7, SS 116 receives subpacket SP1 and first control information in subframe SF1. SS 116 processes SP1 and fails to recover the original data packet P (process step 702). SS 116 then transmits a NACK message to BS 102 (process step 704). In subframe SF5, SS 116 receives Data X, processes SP1 and X together, fails to recover the original data packet P, and transmits a NACK message to BS 102 (process steps 712 and 714). In subframe SF9, SS 116 receives Data Y, processes SP1, X, and Y together, fails to recover the original data packet P, and transmits a NACK message to BS 102 (process steps 722 and 724). In subframe SF13, SS 116 receives Data Z, processes SP1, X, Y, and Z together, and fails to recover the original data packet P (process step 732). Since the maximum number of retransmissions has been reached, SS 116 discards X, Y and Z (process step 734) and transmits a NACK message to BS 102 (process steps 736).

In case of preemption as described in this case, when BS 102 retransmits subpacket SP2 at a later time, a new control information message will be transmitted along with subpacket SP2. SS 116 then combines the stored subpacket SP1 and the newly received subpacket SP2 for decoding of the data packet P. If needed, retransmissions of subpackets SP3 and SP4 may follow according to the principles of the present disclosure described above. That is, if subpackets SP3 and SP4 are transmitted synchronously after subpacket SP2, no control channel information accompanies these subpackets. However, if subpackets SP3 and SP4 are transmitted asynchronously, additional control channel information accompanies these subpackets.

Figure 8:
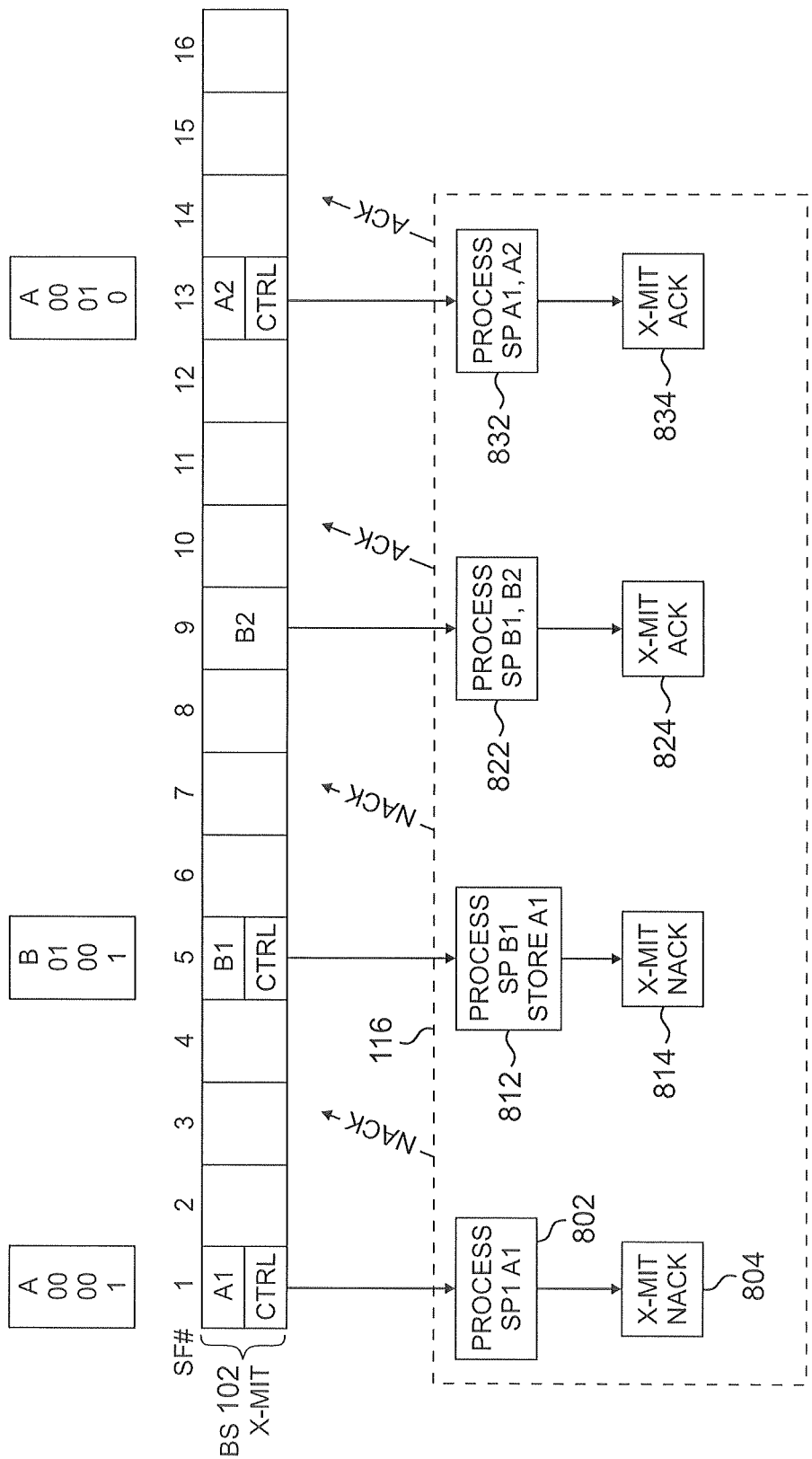
FIG. 8 illustrates a low overhead asynchronous HARQ technique according to another embodiment of the disclosure.

FIG. 8 illustrates a low overhead asynchronous HARQ technique according to another embodiment of the disclosure. In FIG. 8, BS 102 transmits to SS 116 subpackets associated with a low priority packet A and then preempts the data packet A with subpackets associated with a high priority packet B. Both data streams, A and B, are directed to SS 116.

Initially, BS 102 transmits in subframe SF1 a first subpacket SP A1 from the low priority data packet A, along with first control information. The first control information (00 00 1) indicates SAW channel #1 (00), subpacket #1 (00), and the New Data Indicator is set to 1, which means that it is the start of a new information packet transmission. SS 116 processes subpacket SP A1, is unable to recover data packet A, and transmits a NACK message to BS 102 (process steps 802 and 804).

In subframe SF5, BS 102 transmits a first subpacket B1 from the high priority data packet B, along with second control information. In subframe SF5, SS 116 expects a synchronous retransmission of subpacket SP A2 after sending a NACK signal to BS 102, but the transmission is preempted in favor of subpacket SP B1, the first subpacket from high priority information data packet B. The second control information (01 00 1) indicates SAW channel #2 (01), subpacket #1 (00), and the New Data Indicator is set to 1. In response, SS 116 stores subpacket SP A1, processes subpacket SP B1, is unable to recover data packet B, and transmits a NACK message to BS 102 (process steps 812 and 814).

In subframe SF9, BS 102 transmits a second subpacket B2 from the high priority data packet B, but without control information. Since, the retransmission of the second subpacket SP B2 from data packet B is synchronous in subframe SF9, no control information is transmitted for to SS 116 in subframe SF9. SS 116 processes subpackets SP B1 and SP B2, successfully recovers data packet B, and transmits an ACK message to BS 102 (process steps 822 and 824).

Finally, in subframe SF13, BS 102 transmits a second subpacket SP A2 from the low priority data packet A, along with third control information. The third control information is sent in subframe SF13 because subpacket SP A2 is considered an asynchronous transmission after preemption of data packet A in subframe SF5. The third control information (00 01 0) indicates SAW channel #1 (00), subpacket #2 (01), and the New Data Indicator is set to 0, which means that subpacket SP A2 is a continuation of a previous information packet transmission. SS 116 processes subpackets SP A1 and SP A2, successfully recovers data packet A, and transmits an ACK message to BS 102 (process steps 832 and 834).

Figure 9:
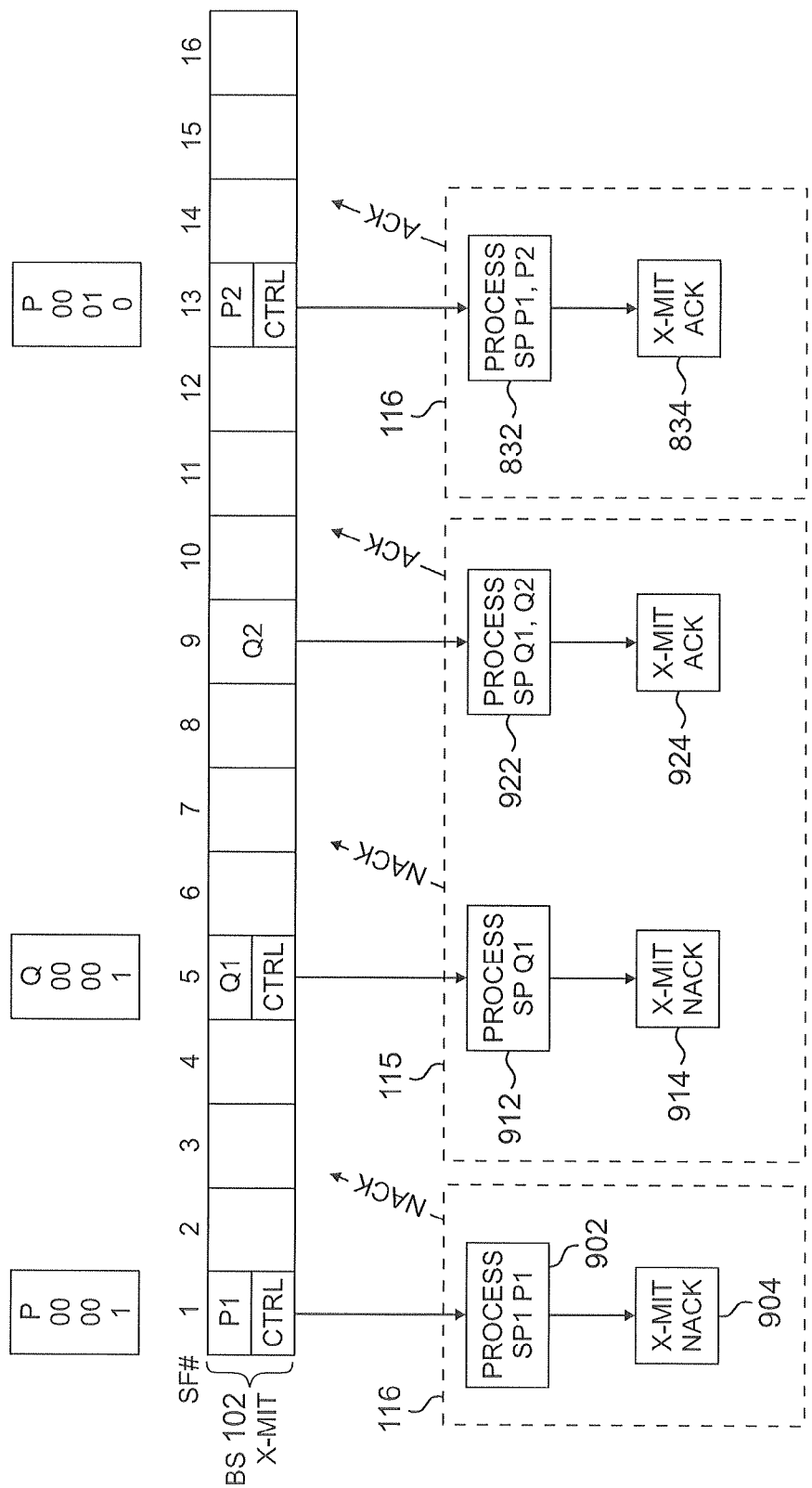
FIG. 9 illustrates a low overhead asynchronous HARQ technique according to another embodiment of the disclosure.

FIG. 9 illustrates a low overhead asynchronous HARQ technique according to another embodiment of the disclosure. In FIG. 9, BS 102 transmits to SS 116 subpackets associated with a low priority packet P and then pre-empts the data packet P with subpackets associated a high priority packet Q that are directed to a different subscriber station, SS 115. This may happen due to quality of service (QoS) priority considerations between subscriber stations or based on the scheduler decision determined from, for example, the relative channel conditions of the two subscriber stations. Thus, unlike FIG. 8, data streams P and Q are directed to different subscriber stations.

Initially, BS 102 transmits in subframe SF1 a first subpacket SP P1 from the low priority data packet P, along with first control information. The first control information (00 00 1) indicates SAW channel #1 (00), subpacket #1 (00), and the New Data Indicator is set to 1, which means that it is the start of a new information packet transmission. SS 116 processes subpacket SP P1, is unable to recover data packet A, and transmits a NACK message to BS 102 (process steps 902 and 904).

In subframe SF5, BS 102 transmits to SS 115 a first subpacket Q1 from the high priority data packet Q, along with second control information. In subframe SF5, SS 116 expects a synchronous retransmission of subpacket SP P2 after sending a NACK signal to BS 102, but the transmission is pre-empted in favor of subpacket SP Q1, the first subpacket from high priority information data packet Q.

The second control information (00 00 1) indicates SAW channel #1 (00), subpacket #1 (00), and the New Data Indicator is set to 1. It should be noted that in this case, the same SAW channel—SAW channel #1 indicated by 00—can be used because SS 116 and SS 115 are identified by a separate field in the control message. After sending a NACK message in subframe SF1, SS 116 expects a retransmission of subpacket SP P2 in subframe SF5. However, SS 116 detects a transmission for SS 115.

In response, SS 116 stores subpacket SP P1 for later processing. Meanwhile, SS 115 processes subpacket SP Q1, is unable to recover data packet Q, and transmits a NACK message to BS 102 (process steps 912 and 914).

In subframe SF9, BS 102 transmits a second subpacket Q2 from the high priority data packet Q, but without control information. Since, the retransmission of the second subpacket SP Q2 from data packet Q is synchronous in subframe SF9, no control information is transmitted to SS 116 in subframe SF9. SS 116 processes subpackets SP Q1 and SP Q2, successfully recovers data packet Q, and transmits an ACK message to BS 102 (process steps 922 and 924).

Finally, in subframe SF13, BS 102 transmits a second subpacket SP P2 from the low priority data packet P, along with third control information. The third control information is sent in subframe SF13 because subpacket SP P2 is considered an asynchronous transmission after preemption of data packet P in subframe SF5. The third control information (00 01 0) indicates SAW channel #1 (00), subpacket #2 (01), and the New Data Indicator is set to 0, which means that subpacket SP P2 is a continuation of a previous information packet transmission. SS 116 processes subpackets SP P1 and SP P2, successfully recovers data packet P, and transmits an ACK message to BS 102 (process steps 932 and 934).

It is noted that in some embodiment of the present disclosure, a NACK message may be indicated by a DTX transmission or an "OFF" signal, that is, the absence of any transmission. However, an ACK message is indicated by transmitting at least some energy or an "ON" signal in the ACK/NACK channel. It should be noted that when a transmission to a first subscriber station is preempted by another packet transmission to a second subscriber station, the ACK/NACK channel is used to provide feedback to the second subscriber station. Therefore, the preempted first subscriber station should not be transmitting any energy over the ACK/NACK channel. An ACK/NACK channel, for example, is defined as a certain time-frequency resource in the example of a multi-carrier OFDM system or as a code in the example of a CDMA transmission. If a packet transmission is not preempted, the base station interprets the absence of any energy on the ACK/NACK channel as an indication of a NACK message.

Figure 10:
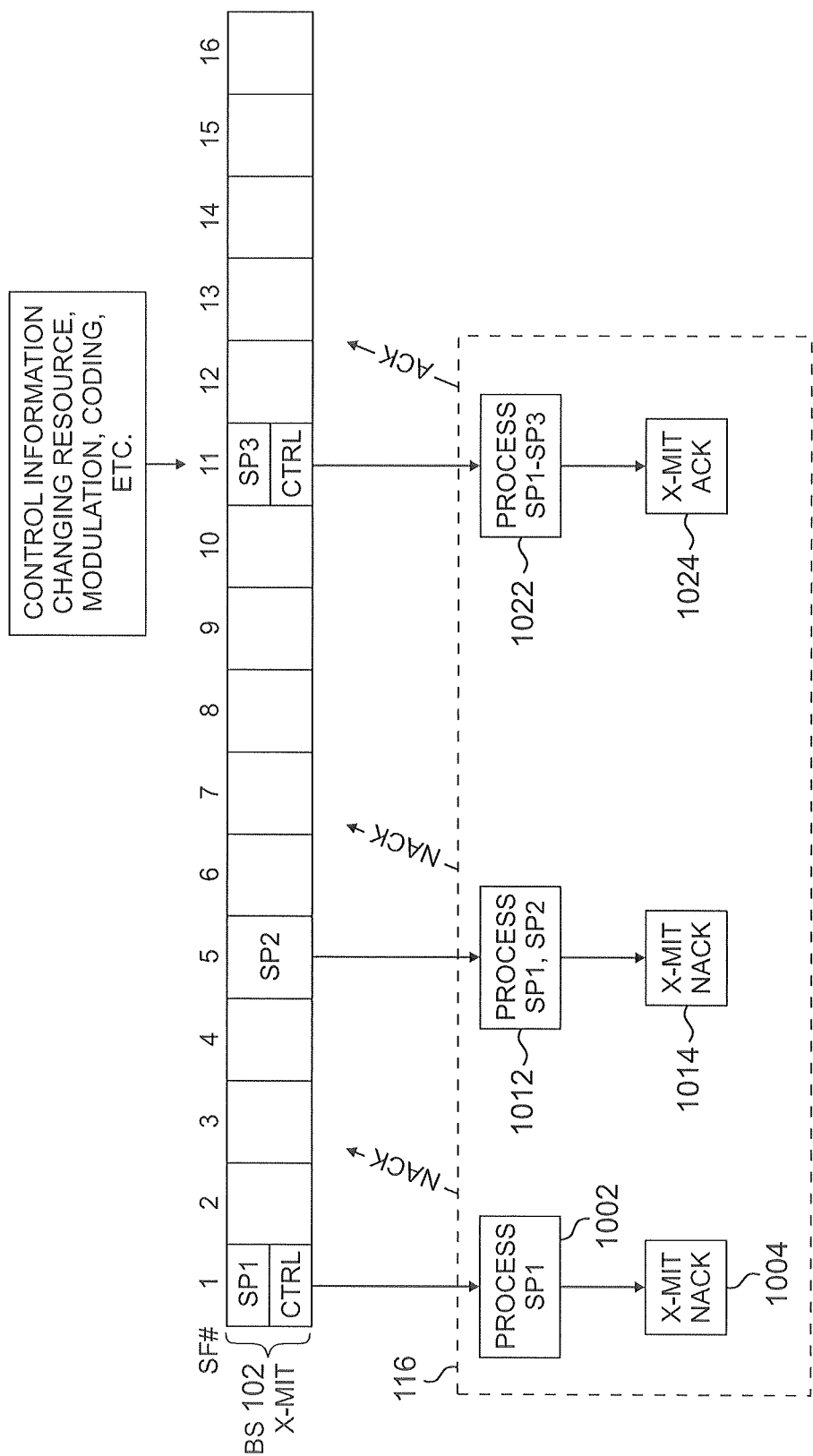
FIG. 10 illustrates a low overhead asynchronous HARQ technique according to another embodiment of the disclosure.

FIG. 10 illustrates a low overhead asynchronous HARQ technique according to another embodiment of the disclosure. In FIG. 10, one or more of the timing, resource allocation, modulation and coding formats may be changed by sending a control message along with a subpacket retransmission. In FIG. 10, BS 102 transmits a first subpacket SP1 and first control information to SS 116 during subframe SF1. SS 116 receives subpacket SP1 and first control information in subframe SF1. SS 116 processes SP1 and fails to recover the original data packet P (process step 1002). SS 116 then transmits a NACK message to BS 102 (process step 1004).

BS 102 transmits the second subpacket SP2 synchronously, so that additional control information is not required. SS 116 receives subpacket SP2, processes subpackets SP1 and SP2 together and fails to recover the original data packet P (process step 1012). SS 116 then transmits a NACK message to BS 102 (process step 1014).

Finally, BS 102 transmits third subpacket SP3 asynchronously, along with third control information. The third control information may be use to modify one or more of the resource allocation (i.e., time-frequency slot of subcarriers), modulation and coding formats, and the like. SS 116 receives third subpacket SP3 and the third control information and uses the third control information to demodulate and decode subpacket SP3. SS 116 then processes subpackets SP1-SP3 together and successfully recovers the original data packet P (process step 1022). SS 116 then transmits an ACK message to BS 102 (process step 1024).

Figure 11:
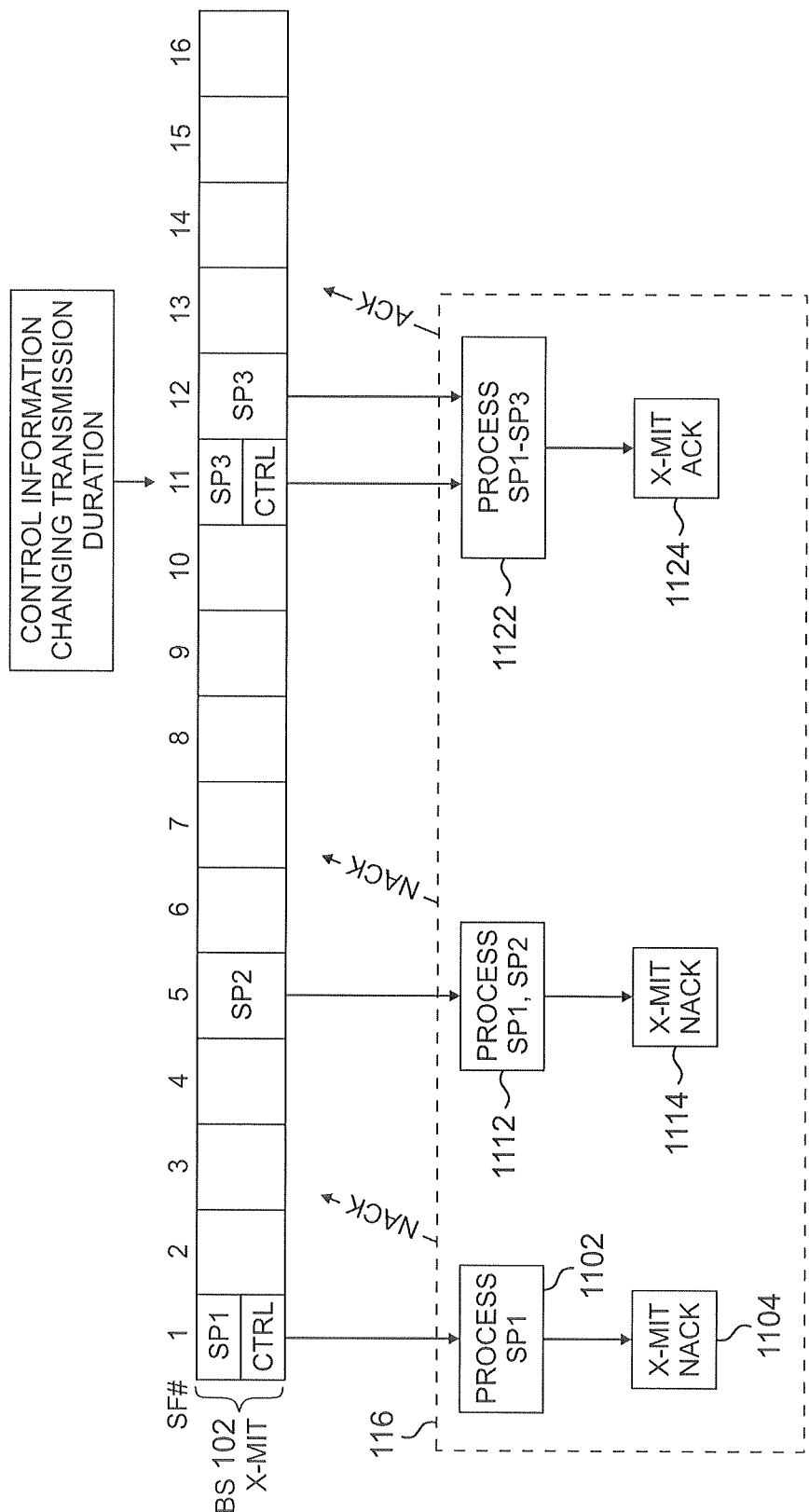
FIG. 11 illustrates a low overhead asynchronous HARQ technique according to another embodiment of the disclosure.

FIG. 11 illustrates a low overhead asynchronous HARQ technique according to another embodiment of the disclosure. In FIG. 11, in addition to the timing, resource allocation, modulation and coding formats, the duration of transmission may also be changed on retransmission relative to the previous transmission. The new retransmission duration is indicated by the control information sent when such a change takes place. In FIG. 11, the retransmission duration for SP3 is 2 subframes relative to 1 subframe duration for SP1 and SP2.

BS 102 transmits a first subpacket SP1 and first control information to SS 116 during subframe SF1. SS 116 receives subpacket SP1 and first control information in subframe SF1. SS 116 processes SP1 and fails to recover the original data packet P (process step 1102). SS 116 then transmits a NACK message to BS 102 (process step 1104).

BS 102 then transmits the second subpacket SP2 synchronously, so that additional control information is not required. SS 116 receives subpacket SP2, processes subpackets SP1 and SP2 together and fails to recover the original data packet P (process step 1112). SS 116 then transmits a NACK message to BS 102 (process step 1114).

Finally, BS 102 transmits third subpacket SP3 asynchronously in subframe SF11, along with third control information. The third control information modifies the transmission duration of subpacket SP3. Subpacket SP3 is transmitted across two subframes, SF11 and SF12. SS 116 receives a portion of third subpacket SP3 and the third control information in subframe SF11. SS 116 also receives the remainder of third subpacket SP3 in subframe SF12 and uses the third control information to recover all of subpacket SP3 from both subframes. SS 116 then processes subpackets SP1-SP3 together and successfully recovers the original data packet P (process step 1122). SS 116 then transmits an ACK message to BS 102 (process step 1124).

Figure 12:
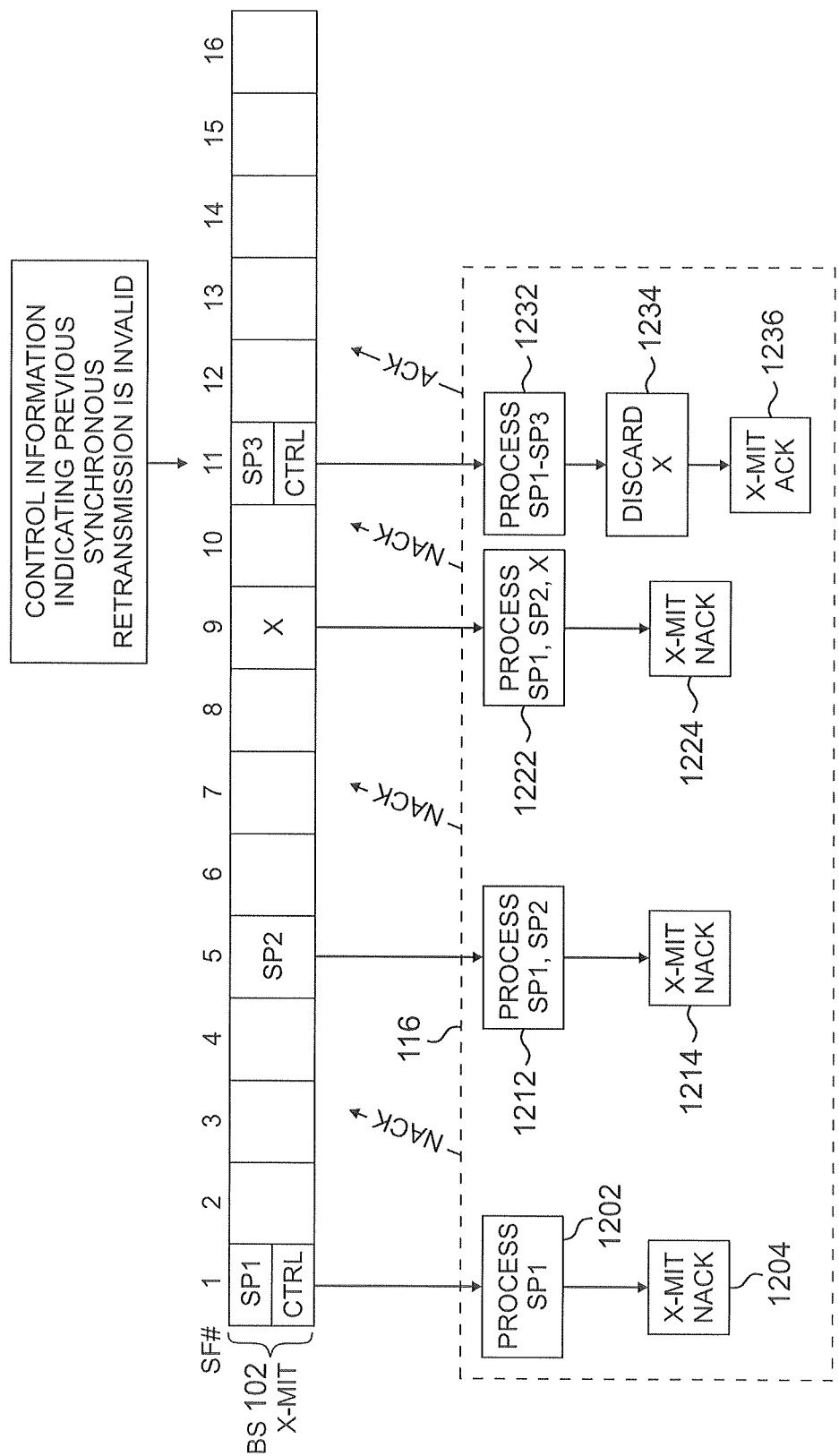
FIG. 12 illustrates a low overhead asynchronous HARQ technique according to another embodiment of the disclosure.
Figure 13:
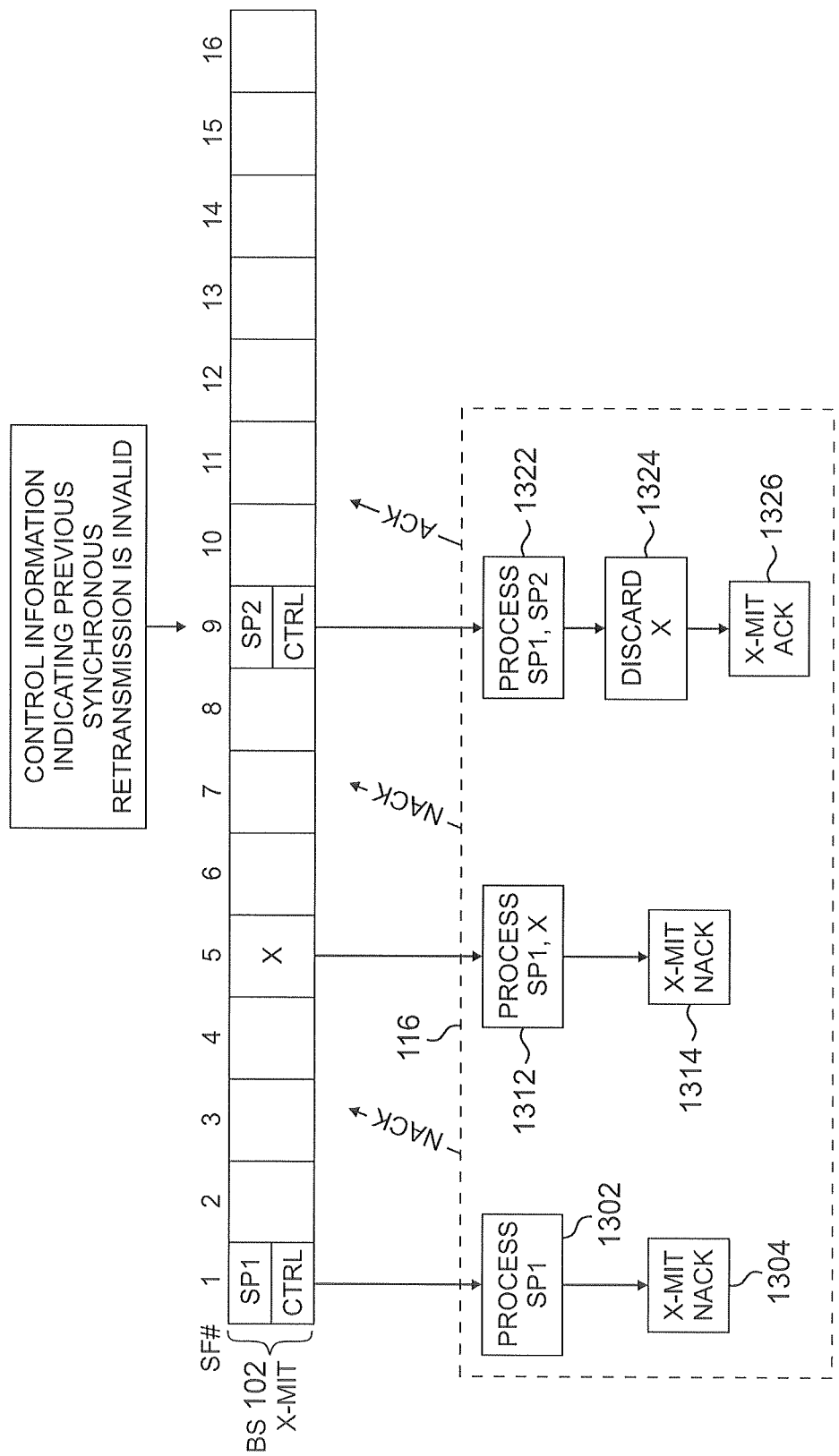
FIG. 13 illustrates a low overhead asynchronous HARQ technique according to another embodiment of the disclosure.

FIGS. 12 and 13 illustrate a low overhead asynchronous HARQ technique according to another embodiment of the disclosure. Upon receiving a retransmission along with control information at either a synchronous subframe or an asynchronous subframe for the current packet transmission, SS 116 does not discard the previous synchronous retransmission. BS 102 notifies SS 116 to keep the previous synchronous retransmission with an indication in the second control information message as shown in FIGS. 12 and 13. By way of example, this may be indicated by a 1-bit indication that indicates whether to keep or discard the previous synchronous retransmission. It should be noted that more than 1-bit can be used to signal this status if the control channel indication applies to multiple previous synchronous retransmissions upon receiving a retransmission along with the control channel.

In FIG. 12, BS 102 transmits a first subpacket SP1 and first control information to SS 116 during subframe SF1. SS 116 receives subpacket SP1 and first control information in subframe SF1. SS 116 processes SP1 and fails to recover the original data packet P (process step 1202). SS 116 then transmits a NACK message to BS 102 (process step 1204). BS 102 then transmits the second subpacket SP2 synchronously in subframe SF5, so that additional control information is not required. SS 116 receives subpacket SP2, processes subpackets SP1 and SP2 together and fails to recover the original data packet P (process step 1212). SS 116 then transmits a NACK message to BS 102 (process step 1214).

BS 102 then transmits Data X to another subscriber station in subframe SF9. Since this is a synchronous frame, SS 116 receives subpacket SP2, processes subpackets SP1 and SP2 and Data X together and once again fails to recover the original data packet P (process step 1222). SS 116 then transmits a NACK message to BS 102 (process step 1224).

In subframe SF11, BS 102 asynchronously transmits third subpacket SP3 and second control information to SS 116 during subframe SF11. SS 116 receives subpacket SP3 and the second control information in subframe SF11. The second control information contains an indicator that indicates the previous synchronous transmission in subframe SF9 was invalid. In response, SS 116 processes SP1, SP2 and SP3 (process step 1232) and discards Data X (process step 1234). SS 116 successfully recovers the original data packet P and then transmits an ACK message to BS 102 (process step 1236).

In FIG. 13, BS 102 transmits a first subpacket SP1 and first control information to SS 116 during subframe SF1. SS 116 receives subpacket SP1 and first control information in subframe SF1. SS 116 processes SP1 and fails to recover the original data packet P (process step 1302). SS 116 then transmits a NACK message to BS 102 (process step 1304).

BS 102 then transmits Data X to another subscriber station in subframe SF5. Since this is a synchronous subframe, SS 116 receives subpacket Data X, processes subpacket SP1 and Data X together and once again fails to recover the original data packet P (process step 1312). SS 116 then transmits a NACK message to BS 102 (process step 1314).

In subframe SF9, BS 102 synchronously transmits second subpacket SP2 and second control information to SS 116 during subframe SF9. SS 116 receives subpacket SP2 and the second control information in subframe SF9. The second control information contains an indicator that indicates the previous synchronous transmission in subframe SF5 was invalid. In response, SS 116 processes SP1 and SP2 (process step 1322) and discards Data X (process step 1324). SS 116 successfully recovers the original data packet P and then transmits an ACK message to BS 102 (process step 1326).

Figure 14:
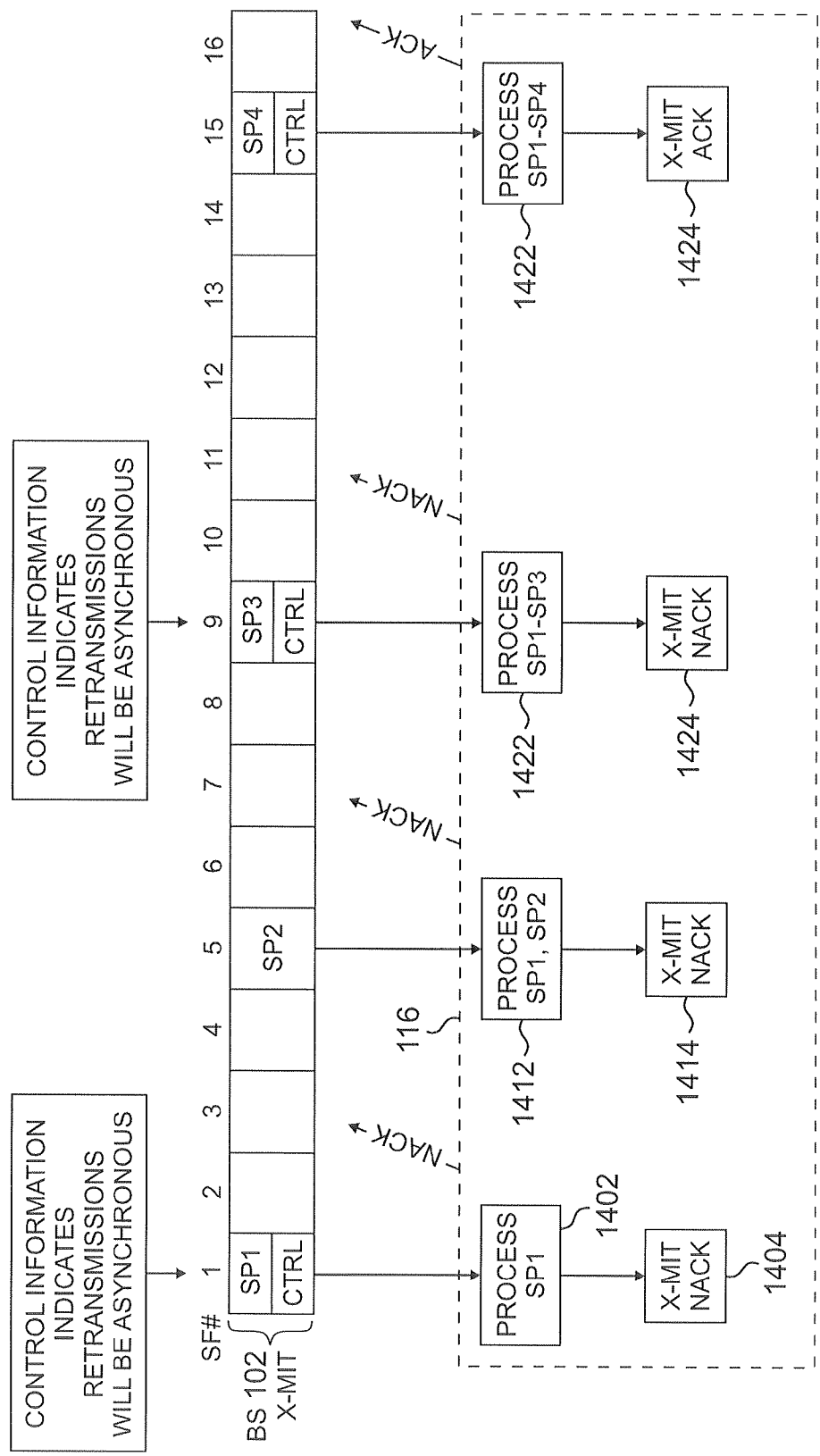
FIG. 14 illustrates a low overhead asynchronous HARQ technique according to another embodiment of the disclosure.

FIG. 14 illustrates a low overhead asynchronous HARQ technique according to another embodiment of the disclosure. In FIG. 14, BS 102 transmits control information messages indicate if future retransmissions will be synchronous or asynchronous. This may be achieved by a 1-bit indication in the control information message.

In subframe SF1, BS 102 transmits subpacket SP1 and first control information indicating that future retransmissions will be synchronous. SS 116 receives subpacket SP1 and first control information in subframe SF1. SS 116 processes subpacket SP1 and fails to recover the original data packet P (process step 1402). SS 116 then transmits a NACK message to BS 102 (process step 1404). In subframe SF5, BS 102 synchronously retransmits subpacket SP2. SS 116 processes subpackets SP1 and SP2 and again fails to recover the original data packet P (process step 1412). SS 116 then transmits another NACK message to BS 102 (process step 1414).

In subframe 9, BS 102 synchronously transmits subpacket SP3 and second control information which indicates that any further retransmissions will happen asynchronously. SS 116 processes subpackets SP1, SP2 and SP3 and again fails to recover the original data packet P (process step 1422). SS 116 then transmits another NACK message to BS 102 (process step 1424).

Finally, in subframe 15, BS 102 asynchronously transmits subpacket SP4 and third control information. SS 116 processes subpackets SP1-SP4 and successfully recovers the original data packet P (process step 1432). SS 116 then transmits another NACK message to BS 102 (process step 1434).

In an advantageous embodiment, the base station may select operation in synchronous HARQ mode or asynchronous HARQ mode based on subscriber station mobility. In general, low-speed subscriber stations benefit from multi-user scheduling. Also, control channel overhead for low-speed subscriber stations is lower because appropriate power levels may be used for control channels due to reliable channel quality estimates available at the base station. Therefore, asynchronous HARQ may be used for low-speed subscriber stations. On the other hand, high-speed subscriber stations do not benefit from multi-user scheduling and signaling overhead is also larger for high-speed subscriber station due to the margins required for unreliable channel quality estimates. Therefore, a synchronous HARQ may be used for high-speed subscriber stations.

In another advantageous embodiment, the base station may select operation in synchronous HARQ mode or asynchronous HARQ mode based on the user memory size to store the subpackets. If a large buffer is available, asynchronous HARQ mode may be used. For small buffer sizes, synchronous HARQ mode is preferred. In another embodiment, the control information is always sent with the retransmissions when the maximum buffer size for the subscriber station is reached.

In another embodiment, the control information sent along with the retransmitted subpackets may be of a smaller size than the control information in the first subpacket transmission. This may be the case, for example, when only a subset of the parameters needs to be changed for the retransmitted subpackets.

In another embodiment, different scrambling codes may be used to scramble data for different subscriber stations. This would prevent a subscriber station from combining and decoding retransmissions destined for other subscriber stations. Also, the subpacket identifiers may be different redundancy versions or may serve as subpacket sequence number.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in a wireless communication network, a base station capable of communicating with a plurality of subscriber stations, the base station comprising:
a transmitter configured to transmit a first data packet to a first subscriber station, wherein the transmitter transmits the first data packet as a plurality of subpackets distributed in subframes of a downlink channel such that a first subpacket of the first data packet is transmitted in a first subframe and a second subpacket of the first data packet is transmitted in a subsequent subframe, the first subpacket comprising a first control information;
wherein the transmitter is configured to transmit in a synchronous mode and an asynchronous mode, and wherein the transmitter is configured to transmit the first subpacket in a first mode comprising the synchronous mode or the asynchronous mode, and transmit the second subpacket in a second mode comprising the synchronous mode or the asynchronous mode, the first mode and the second mode different from one another;
wherein the transmitter is configured to include a second control information in the second subpacket only if a change in a transmission parameter has occurred; and
wherein the transmission parameter is selected from one or more of modulation, coding, and transmission duration.

2. The base station of claim 1, wherein the transmitter is configured to transmit a second data packet, the second data packet comprising a higher priority than the first data packet, wherein a first subpacket of the second data packet is transmitted in a subframe subsequent to the first subframe and prior to a transmission of the second subpacket of the first data packet.

3. The base station of claim 2, wherein the transmitter is configured to transmit the second subpacket of the first data packet in the asynchronous mode in response to the second data packet pre-empting the first data packet.

4. The base station of claim 1, wherein the transmitter is configured to not include control information in the second subpacket of the first data packet when the second subpacket of the first data packet is transmitted in a synchronous mode and transmit the second subpacket of the first data packet in an asynchronous mode when in response to the change in the transmission parameter.

5. The base station of claim 1, wherein the second control information is configured to change a transmission duration of the second subpacket.

6. The base station of claim 1, wherein the second control information comprises information indicating that a previous synchronous transmission is invalid.

7. The base station of claim 6, wherein the transmitter is configured to include the second control information in a synchronous transmission of the second subpacket of the first data packet.

8. A transmitter for use in a base station in a wireless communication network, the base station capable of communicating with a plurality of subscriber stations, the transmitter comprising:
a controller configured to control the transmitter to generate a transmission path for transmitting a first data packet to a first subscriber station; and
the transmission path configured to transmit the first data packet as a plurality of subpackets distributed in subframes of a downlink channel such that a first subpacket of the first data packet is transmitted in a first subframe and a second subpacket of the first data packet is transmitted in a subsequent subframe, the first subpacket comprising a first control information, the transmission path further configured to transmit the plurality of subpackets in a synchronous mode and an asynchronous mode;
wherein the controller is configured to generate the transmission path for transmitting the first subpacket in a first mode comprising the synchronous mode or the asynchronous mode, and transmitting the second subpacket in a second mode comprising the synchronous mode or the asynchronous mode, the first mode and the second mode different from one another;
wherein the controller is configured to generate the transmission path that includes a second control information in the second subpacket only if a change in a transmission parameter has occurred; and
wherein the transmission parameter is selected from one or more of modulation, coding, and transmission duration.

9. The transmitter of claim 8, wherein the controller is configured to control the transmitter to generate the transmission path for transmitting a second data packet, the second data packet comprising a higher priority than the first data packet, wherein a first subpacket of the second data packet is transmitted in a subframe subsequent to the first subframe and prior to a transmission of the second subpacket of the first data packet.

10. The transmitter of claim 9, wherein the controller is configured to control the transmitter to generate the transmission path for transmitting the second subpacket of the first data packet in the asynchronous mode in response to the second data packet pre-empting the first data packet.

11. The transmitter of claim 8, wherein the controller is configured to control the transmitter to generate the transmission path to not include control information in the second subpacket of the first data packet when the second subpacket of the first data packet is transmitted in a synchronous mode and transmit the second subpacket of the first data packet in an asynchronous mode when in response to the change in the transmission parameter.

12. The transmitter of claim 8, wherein the second control information is configured to change transmission duration of the second subpacket.

13. The transmitter of claim 8, wherein the second control information comprises information indicating that a previous synchronous transmission is invalid.

14. The transmitter of claim 13, wherein the controller is configured to control the transmitter to generate the transmission path to include the second control information in a synchronous transmission of the second subpacket of the first data packet.

15. A method for operating a base station in a wireless communication network comprising a base station capable of performing an adaptive Hybrid Automatic Repeat Request communication with a plurality of subscriber stations, the method comprising:

transmitting in a synchronous mode and an asynchronous mode a first data packet to a first subscriber station, wherein the first data packet comprises a plurality of subpackets, and wherein the transmitting comprises:

distributing the plurality of subpackets over a plurality of subframes of a downlink channel such that a first subpacket of the first data packet is transmitted in a first subframe and a second subpacket of the first data packet is transmitted in a subsequent subframe, the first subpacket comprising a first control information;

including a second control information in the second subpacket in response to a change in a transmission parameter and wherein the second control information is not included in the second subpacket when no change in the transmission parameter has occurred, wherein the transmission parameter is selected from one or more of modulation, coding, and transmission duration; and transmitting the first subpacket in a first mode comprising a synchronous mode and an asynchronous mode, and transmitting the second subpacket in a second mode comprising the synchronous mode or the asynchronous mode, wherein the first mode and the second mode are different from one another.

16. The method of claim 15, further comprising:

transmitting a second data packet, the second data packet comprising a higher priority than the first data packet, wherein a first subpacket of the second data packet is transmitted in a subframe subsequent to the first subframe and prior to a transmission of the second subpacket of the first data packet.

17. The method of claim 16, wherein transmitting the second packet in one of a synchronous mode and an asynchronous mode comprises:

transmitting the second subpacket of the first data packet in the asynchronous mode in response to the second data packet pre-empting the first data packet.

18. The method of claim 15, wherein transmitting the second packet in one of a synchronous mode and an asynchronous mode comprises:

transmitting the second subpacket of the first data packet without control information when the second subpacket of the first data packet is transmitted in a synchronous mode; and transmitting the second subpacket of the first data packet in an asynchronous mode when in the second control information is included in the second subpacket in response to the change in the transmission parameter.

19. The method of claim 15, wherein the second control information is configured to change a transmission duration of the second subpacket.

20. The method of claim 15, wherein transmitting the second packet in one of a synchronous mode and an asynchronous mode comprises including in the second control information an indicator that a previous synchronous transmission is invalid.

21. The method of claim 15, wherein transmitting the second packet in one of a synchronous mode and an asynchronous mode comprises:

selecting, based on a buffer size of the first subscriber station, one of:
the asynchronous mode; and
the synchronous mode.

* * * * *